United States Patent [19]

Leopold, Jr. et al.

[11] Patent Number: 4,566,481
[45] Date of Patent: Jan. 28, 1986

[54] TAMPERPROOF FIRE HYDRANTS

[75] Inventors: Wilbur R. Leopold, Jr.; Dennis W. Humes, both of Decatur, Ill.

[73] Assignee: Mueller Co., Decatur, Ill.

[21] Appl. No.: 736,830

[22] Filed: May 22, 1985

[51] Int. Cl.⁴ ............................ F16K 35/06; E03B 9/06
[52] U.S. Cl. ........................ 137/296; 137/382.5; 137/800; 220/85 P; 220/284; 251/291
[58] Field of Search .................... 137/296, 382, 382.5, 137/371, 377, 381, 800; 220/85 P, 284, 285, 286, 253; 215/213, 215; 251/291

[56] References Cited

U.S. PATENT DOCUMENTS

| | | | |
|---|---|---|---|
| Re. 27,616 | 4/1973 | Diaz | 137/382.5 |
| 2,762,386 | 9/1956 | Fogle | 137/296 |
| 3,070,115 | 12/1962 | Jester | 137/296 |
| 3,453,655 | 7/1969 | Quinones et al. | 137/296 |
| 3,492,841 | 2/1970 | Ipri | 70/231 |
| 3,532,108 | 10/1970 | Sullivan | 137/296 |
| 3,532,109 | 10/1970 | Smith | 137/296 |
| 3,709,249 | 1/1973 | Diaz | 137/296 |
| 3,840,041 | 10/1974 | McMurray | 137/296 |
| 3,935,877 | 2/1976 | Franceschi | 137/296 |
| 4,083,377 | 4/1978 | Luckenbill | 137/296 |
| 4,182,361 | 1/1980 | Oakey | 137/296 |
| 4,398,556 | 8/1983 | Pereira et al. | 137/296 |

Primary Examiner—George L. Walton
Attorney, Agent, or Firm—Cushman, Darby & Cushman

[57] ABSTRACT

A tamperproof fire hydrant which can only be operated with the use of a special operating tool thus preventing the opening of the hydrant by unauthorized persons for unauthorized use. Additionally the tubular hold-down nut for the operating nut is so designed to prevent unauthorized disassembly of the hydrant by unauthorized personnel. To prevent unauthorized use or unauthorized disassembly the polygonal shaped operating nut is concealed by a dome shaped cap covering both the hold-down nut and the operating nut, the cap being freely rotatable with respect thereto. The dome shaped cap permits only limited access to the operating nut. Additionally the hold-down nut for the operating nut is also protected in this manner and is provided with a specifically shaped outer surface which requires a special tool usable only when the dome shaped cap for the operating nut is removed.

9 Claims, 14 Drawing Figures

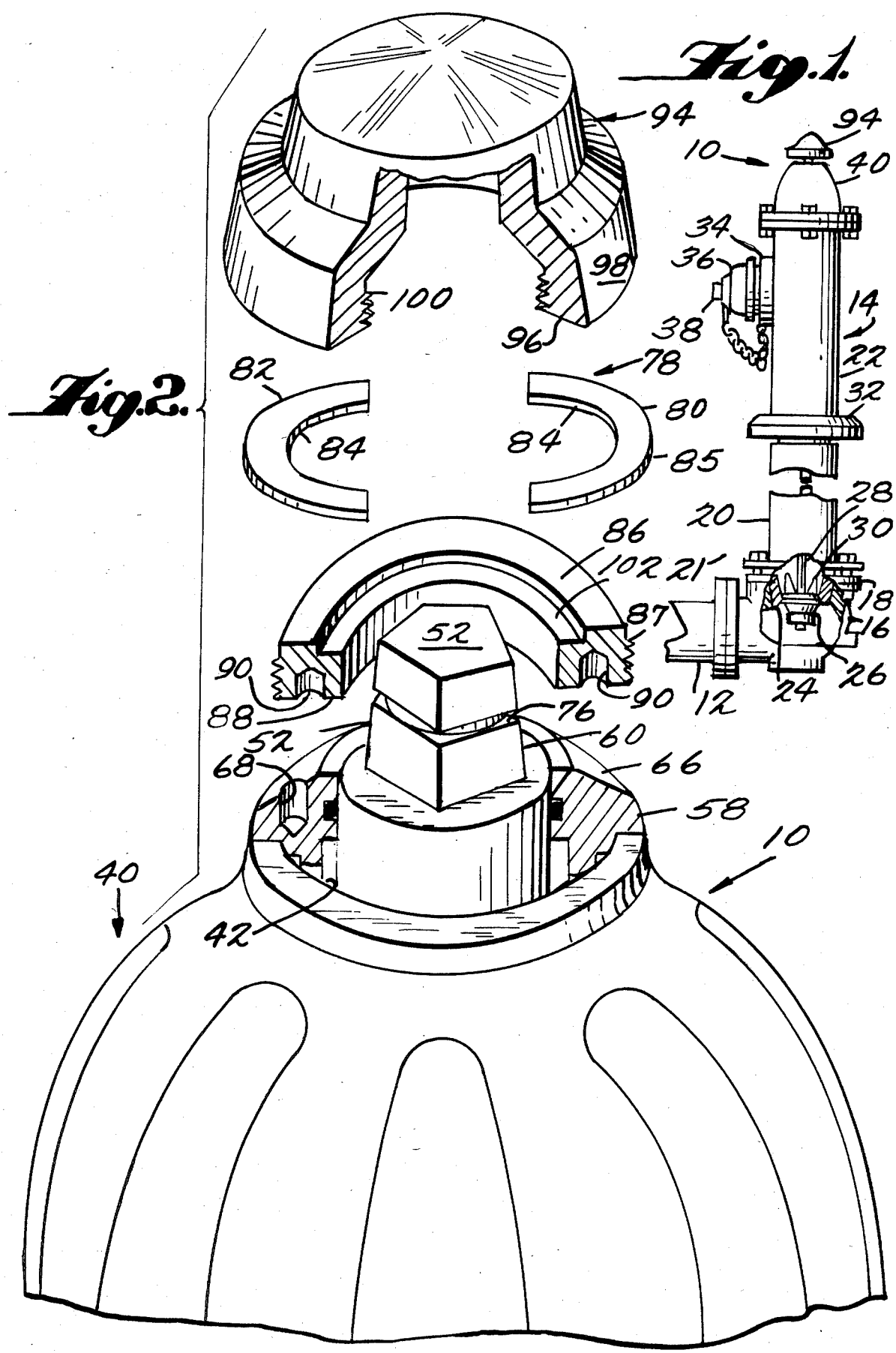

TAMPERPROOF FIRE HYDRANTS

FIELD OF THE INVENTION

The present invention relates to improvements in tamperproof fire hydrants to prevent unauthorized use of the hydrant and/or unauthorized disassembly and removal of valuable parts of the hydrant. More specifically, the present invention relates to tamperproof fire hydrants or modified conventional fire hydrants to make them tamperproof which are provided with a dome shaped cap covering the polygonal portion of the hydrant's operating nut so as to provide only limited access thereto with a special tool.

BACKGROUND OF THE INVENTION

In recent years municipalities have found vandalism of fire hydrants an increasing problem. Such vandalism can be divided into two categories, first, unauthorized operation of the fire hydrant and, secondly, disassembly of the operating mechanism to remove brass parts and other valuable parts for re-sale of the metal.

Heretofore, efforts have been made to design tamperproof fire hydrants which required specially designed fire hydrants utilizing tools attached to the hydrant to operate the valve stems vertically against water pressure to open the hydrants or to receive a peculiarly shaped operating nut. These types of tamperproof hydrants were costly to manufacture and required municipalities to spend a great deal of money replacing existing hydrants.

A second type of tamperproof hydrant requiring extensive modification of existing fire hydrants was designed. This second type of tamperproof hydrant includes utilizing a dome shaped cap to conceal the polygonal end portion of the operating nut and leaving only limited access thereto. However, the means for rotatably retaining the dome shaped cap operatively on the polygonal end portion of the operating nut included utilizing a number of parts with one of the parts being cylindrical and fixed to the polygonal end portion against axial and rotary movement by a number of bolts and the dome shaped cap then being operatively rotatably secured thereto by utilizing a retaining ring threaded into the cap. This particular arrangement was costly and if any of the bolts subsequently backed out of the cylindrical part, they would engage against either the flange of the cap or the retaining ring preventing the cap from being freely rotatable or could lose engagement with the operating nut and thus allow the device to be removed.

PRIOR ART

The following prior art patents generally relate to tamperproof fire hydrants:

| U.S. Pat. No. | Name | Issue Date |
|---|---|---|
| 2,762,386 | Fogle | Sept. 11, 1956 |
| 3,070,115 | Jester | Dec. 25, 1962 |
| 3,453,655 | Quinones et al | Jul. 1, 1969 |
| 3,492,841 | Ipri | Feb. 3, 1970 |
| 3,532,108 | Sullivan | Oct. 6, 1970 |
| 3,532,109 | Smith | Oct. 6, 1970 |
| 3,709,249 | Diaz | Jan. 9, 1973 |
| Re. 27,616 | Diaz | Apr. 17, 1973 |
| 3,840,041 | McMurray | Oct. 8, 1974 |
| 3,935,877 | Franceschi | Feb. 3, 1976 |
| 4,083,377 | Luckenbill | Apr. 11, 1978 |
| 4,182,361 | Oakey | Jan. 8, 1980 |
| 4,398,556 | Pereira et al | Aug. 16, 1983 |

U.S. Pat. No. Re. 27,616 discloses a protective device for fire hydrants utilizing a dome shaped cap which allows limited access to the polygonal end of the hydrant operating nut. The protective device requires a cylindrical part rigidly held onto the polygonal end portion of the operating nut by a plurality of bolts. The cylindrical part is specifically shaped to receive a portion of an annular retaining ring threaded into the skirt of the cap, thus, preventing removal of the cap axially but providing for rotary movement relative to the cylindrical part.

U.S. Pat. No. 3,709,249 discloses a tamperproof fire hydrant similar to U.S. Pat. No. Re. 27,616 with the exception that the cylindrical part rigidly carried on the polygonal end portion of the operating nut is provided with a chordal face whereby torque can be applied to the cylindrical part or collar for which in turn transfers the torque to the polygonal portion of the operating nut for the fire hydrant.

U.S. Pat. Nos. 3,532,108 and 3,532,109 disclose similar arrangements of tamperproof hydrants in which the valve stem is moved vertically downwardly to open the valve against liquid pressure by means requiring a special tool to depress the same.

U.S. Pat. No. 3,935,877 discloses a modification of a conventional hydrant so that the same is tamperproof, the modification including a cap housing having an exposed surface with a plurality of major faces and minor faces so arranged as to require a complimentary tool clamped onto the same for operating the hydrant. The cap housing is rigidly retained on the polygonal portion of the operating nut or stem.

The remaining patents listed above are of general interest in that they show various tamperproof hydrant arrangements.

BRIEF SUMMARY OF THE INVENTION

The present invention relates to a tamperproof hydrant including a barrel member having an open end portion and valve means positioned in the lower portion thereof. A reciprocating valve stem means extends upwardly from the valve means within the barrel member and a top closure member is secured to the open upper end of the barrel member, the top closure member having an aperture therethrough. A rotatable operating nut has a polygonal end portion projecting out of the aperture of the top closure member, the operating nut threadedly receiving the upper end of the valve stem means. Since the operating nut cannot move axially, rotation of the same causes the valve stem means, which cannot rotate, to move axially and open and close the valve. The polygonal end portion of the operating nut is provided with a retaining ring groove and retaining means loosely received therein prevents an annular retainer member from moving axially outwardly. A dome shaped cap covers all of the polygonal end portion of the operating nut except for a limited area of access thereto, the dome shaped cap being held in position by the annular retainer member so that it can rotate relative to the polygonal end portion of the operating nut. The retaining means which is loosely retained in the groove also is loosely secured between the dome shaped cap and the annular retainer member so that relative rotation of all parts is achieved.

Additionally, the present invention includes an improved hold-down nut for the operating nut, the portion of the hold-down nut extending out of the aperture top of the top closure member being so designed that a conventional wrench cannot be applied to the same. Thus, the hydrant is not only tamperproof against unauthorized use but also against unauthorized disassembly where parts may be stolen.

The present invention has an advantage over previous tamperproof fire hydrants in that while it can be incorporated into new fire hydrants, it may be easily retrofitted to existing conventional fire hydrants in the field at less expense to the customer. A minimum number of parts are utilized for modification.

BRIEF DESCRIPTION OF THE DRAWINGS

FIG. 1 is a side elevation view partly in cross section, the view illustrating the tamperproof hydrant of the present invention;

FIG. 2 is an enlarged fragmentary exploded perspective view of the upper portion of the tamperproof hydrant of the present invention;

DETAILED DESCRIPTION OF THE INVENTION

Figure 3:
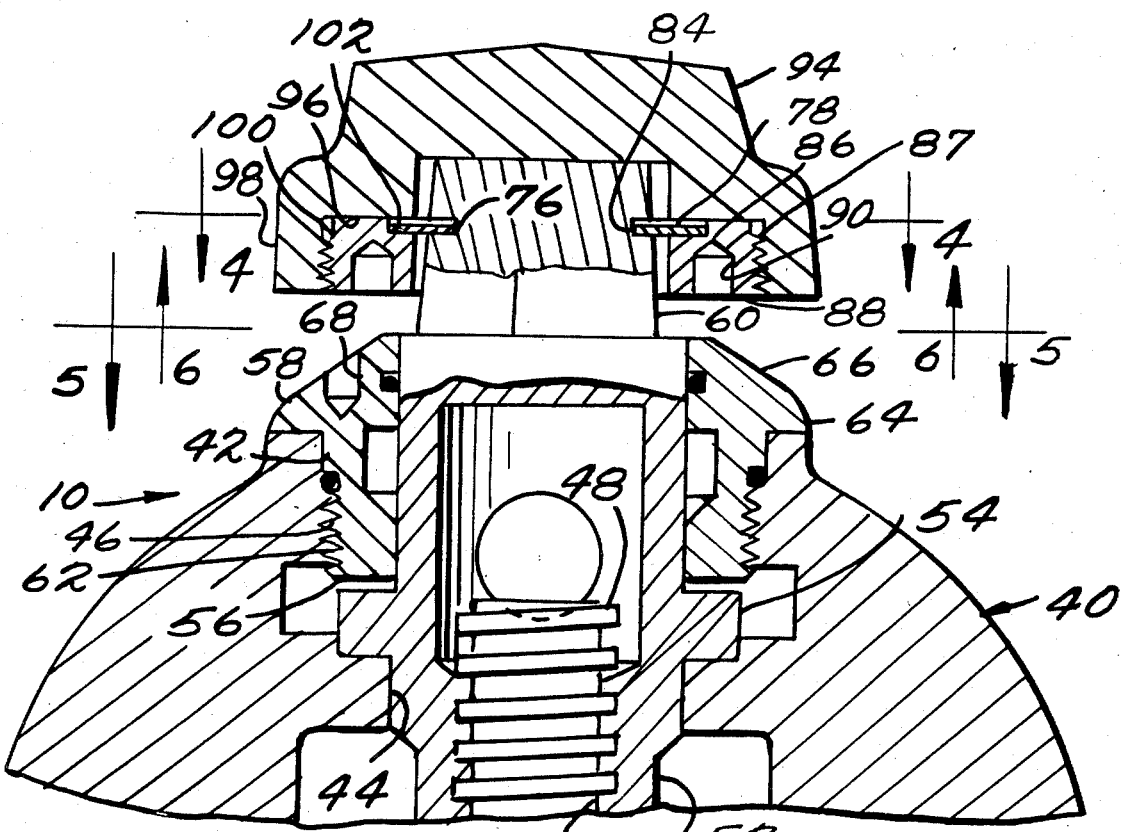
FIG. 3 is a vertical sectional view through the upper portion of the tamperproof hydrant of the present invention.
Figures 4, 7:
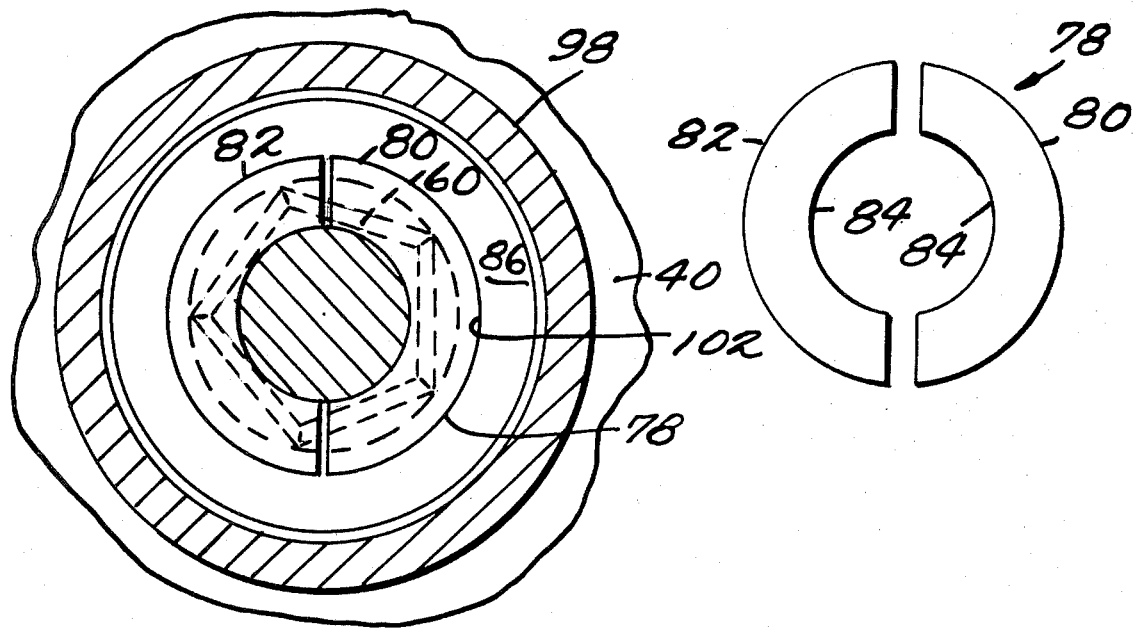
FIG. 4 is a sectional view taken on the line 4—4 of FIG. 3.
FIG. 7 is a plan view of the retaining means shown in FIGS. 2 and 3.

Referring now to the drawings wherein like characters or reference numerals represent like or similar parts, the tamperproof fire hydrant of the present invention as shown in FIGS. 1-3, inclusive, is identified generally by the numeral 10 and it is adapted to be attached to a water main 12. The hydrant 10 includes a hydrant barrel member 14 comprising a shoe 16 having an upwardly open mouth surrounded by a peripheral flange 18, a lower barrel section 20 and an upper barrel section 22. The flange 18 of the shoe 16 is detachably bolted to the lower end of the lower barrel section 20 by bolt members 21 and further the shoe is provided with a main hydrant valve brass seat ring 24, the brass seat ring having a downwardly facing frusto-conical seat for seating with a reciprocating main valve element 26.

The valve element 26 is provided with an upwardly extending valve stem means 28 and with upwardly extending rib elements 30 which cooperate with longitudinally extending grooves in the seat ring 24. As is now evident, the ribs 30 prevent the valve element 26 as well as the upwardly extending valve stem 30 from rotating but such ribs permit the valve element and valve stem to reciprocate vertically.

The upper barrel section 22 has its lower end connected to the upper end of the lower barrel section 20 by means of a frangible flange connection 32. Additionally the upper barrel section 22 is provided with at least one and preferably more hydrant nozzles 34 having closures 36 detachably carried thereon. Each of the closures is provided with a polygonal nut 38, preferably of pentagon shape.

The hydrant thus far described may be of the type shown in U.S. Pat. No. 4,083,377 to Luckenbill issued Apr. 11, 1978 or U.S. Pat. No. 4,154,259 to Ellis et al issued May 15, 1979, both being assigned to the common assignee of this application, Mueller Co., Decatur, Ill.

The upper section 22 of the barrel member 14 has an open end portion for receiving a top closure member 40 which may be in the form of a bonnet as shown herein and in U.S. Pat. No. 4,154,259 or it may be in the form of the flat closure member shown in U.S. Pat. No. 4,083,377. In both instances, the top closure member 40 has an aperture 42 extending therethrough. The aperture 42 which extends through the top closure member 40 from the exterior to the interior thereof, is provided with an inwardly extending annular shoulder 44 and an interiorly threaded portion 46 above the shoulder. Although not shown in the drawing, the top closure member 40 may be provided with a lubricant reservoir extending downwardly beneath the shoulder 44 such as disclosed in U.S. Pat. Nos. 4,154,259 and 4,083,377.

The valve stem means 28 extends upwardly through the barrel member 14 and is operatively provided on its upper end with exterior threads 48. The exterior threads 48 are arranged to cooperate with interior threads 50 on a rotatable operating nut 52 as best shown in FIG. 3. The rotatable operating nut 52 is provided with an exterior annular flange 54 which is arranged to abut the upper face of the inwardly extending shoulder 44 of the top closure member 40 as well as the lower end 56 of a tubular hold-down nut member 58. As is conventional, the rotatable operating nut 52 extends out the aperture 42 of the top closure member 40 and is provided with a polygonal end portion 60, preferably a pentagon shape. In the prior art arrangements of fire hydrants, a box end hydrant wrench was usually applied over the polygonal end portion 60 of the operating nut 52 for rotating the same to cause the valve stem means 28 to reciprocate and, thus, open and close the hydrant.

The hold-down nut member 58 is provided with exterior threads 62 which cooperate with the interior threads 46 in the aperture 42 of the top closure member 40. The hold-down nut member 58, which prevents axial movement of the rotatable operating nut 52, but allows rotary movement of the same, is provided with an upper end portion 64 which extends out of the aperture 42 of the top closure member 40. The end portion 64, rather than having a polygonal cross section for reception of a wrench as is found in conventional hydrants, is provided with a frusto-conical surface 66 which tapers inwardly in an upward direction. By providing frusto-conical surface 66 on the hold-down nut member, an unauthorized person cannot remove the same with a conventional wrench and, thus, steal valuable parts from the hydrant 10.

Figure 5:
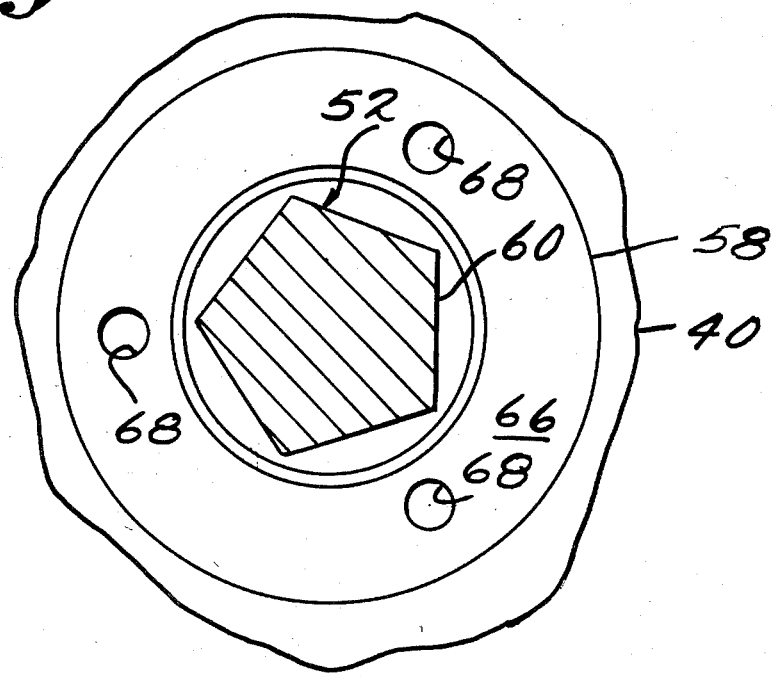
FIG. 5 is a sectional view taken on the line 5—5 of FIG. 3.
Figure 6:
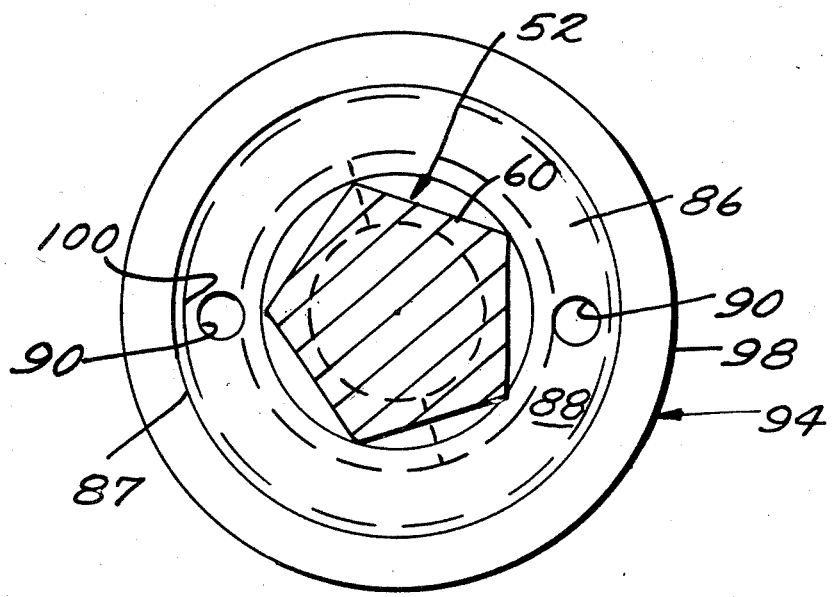
FIG. 6 is a sectional view taken on the line 6—6 of FIG. 3.
Figure 8:
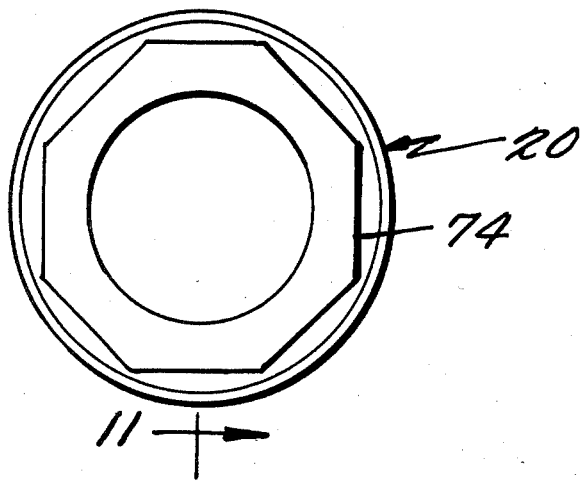
FIG. 8 is a top plan view of a socket-type tool for removing the hold-down nut from the hydrant.
Figure 9:
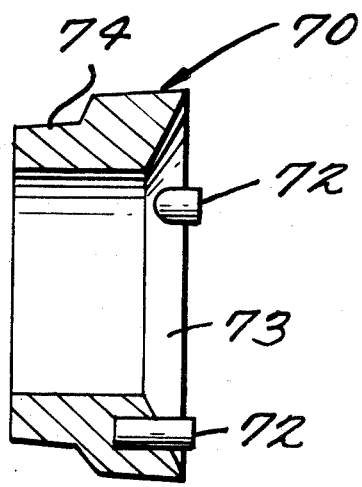
FIG. 9 is a sectional view taken on the line 9—9 of FIG. 8.
Figure 10:
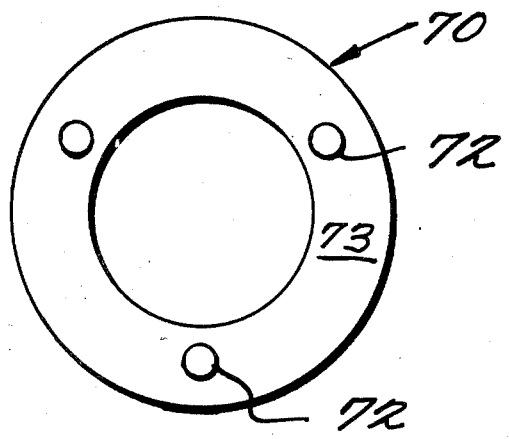
FIG. 10 is a bottom plan view of the socket-type tool of FIG. 8.

In order to insert or remove the tubular hold-down nut member 58, it will be noted in FIG. 5 that the outer frusto-conical surface 66 is provided with at least two inwardly extending circumferentially spaced holes 68. Preferably there are three such holes 68 spaced 120° apart. As shown in FIGS. 8, 9 and 10, an annular socket type drive tool 70 having pins 72 extending from its lower frusto-conical surface 73 is arranged to rotatively fit over the end portion 60 of the operating nut 52, the pins being received in the holes 68. In more detail, the socket type drive tool is annular and is provided with an upper exterior portion of polygonal or non-circular cross section as indicated at 74. It will be obvious now that the tubular hold-down nut 58 can only be removed with the use of the special tool as shown in FIGS. 8, 9 and 10.

Returning now to the description for making the hydrant 10 tamperproof with respect to operation of the same by unauthorized persons, it will be noted that the upper end portion 60 of the rotatable operating nut 52 is provided with an annular groove 76 spaced downwardly from the outer end of the same. The groove 76 is arranged to receive an inner portion of a flat annular retaining means 78 which comprises two semi-circular C-clips 80 and 82. The C-clips 80 and 82 have a thickness such that their inner portions 84 are loosely received in the groove 76.

Figure 11:
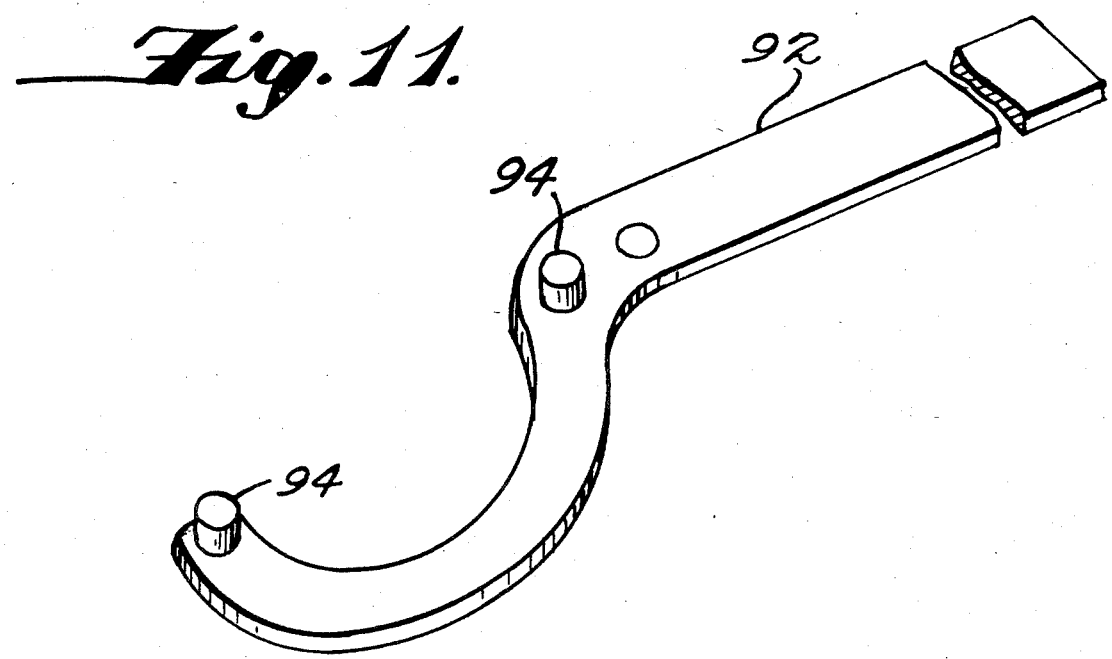
FIG. 11 is a perspective view of a spanner type wrench for installing or removing the annular retainer member from the dome shaped cap.

Prior to inserting the flat semi-circular C-clips 80 and 82 in the groove 76, an annular retainer member 86 having an inside diameter sufficient to loosely fit over and rotate relative to said polygonal end portion 60 of said operating nut 52, is slipped over the same. The annular retainer member 86 has an outer peripheral surface which is threaded as indicated at 87 and has a lower surface 88 provided with at least two circumferentially spaced holes 90 for receiving a spanner type wrench 92 as shown in FIG. 11. The spanner type wrench 92 is a flat member having a pair of pins 94 extending therefrom and arranged to be received in the holes 90. Once the annular retainer member 86 has been slipped over the polygonal end portion 60 of the operating nut 52 then the flat C-clips 80 and 82 are positioned in the groove 76.

A dome shaped cap member 94 having an interior diameter greater than the polygonal end portion 60 of the operating nut 52 is slipped over the end portion of the operating nut. A downwardly facing annular surface 96 is provided as a shoulder in the dome shaped cap member, this inner surface accommodating the outer portion of the C-clips 80 and 82 of the retaining means 78. It will be noted that the interior of the outer skirt 98 of the dome shaped cap member 94 is threaded as indicated at 100, the threads 100 mating with the exterior threads 87 on the annular retainer member 86. When the cap member 94 has been positioned over the end portion 60 and rests on the C-clips 80 and 82, the spanner wrench 92 is used to lift the annular retainer member 86 upwardly so that the dome shaped cap member can be threaded onto the threads of the annular retainer member and, thus, the dome shaped cap member is retained on the end portion 60 of the operating nut 52. The dome shaped cap member 94 may freely rotate with respect to the operating nut 52 in that the annular retainer member 86 is provided with an annular recess in its upper face as indicated at 102 for loosely receiving the outer portion 85 of the C-clips 80 and 82.

When the dome shaped cap member 94 has been so positioned, it will be noted that it can freely rotate with the annular retainer member relative to the retaining means 78 as well as with respect to the end portion 60 of the operating nut member 52. Additionally since the retaining means 78 is loosely carried in the groove 84 as well as between the dome shaped cap member 94 and the annular retainer member 86, there is no chance of binding.

While the dome shaped cap member 94 is preferably made from ductile iron, the annular retainer member 86 would preferably be made of brass or could be stainless steel or high strength plastic.

Figure 12:
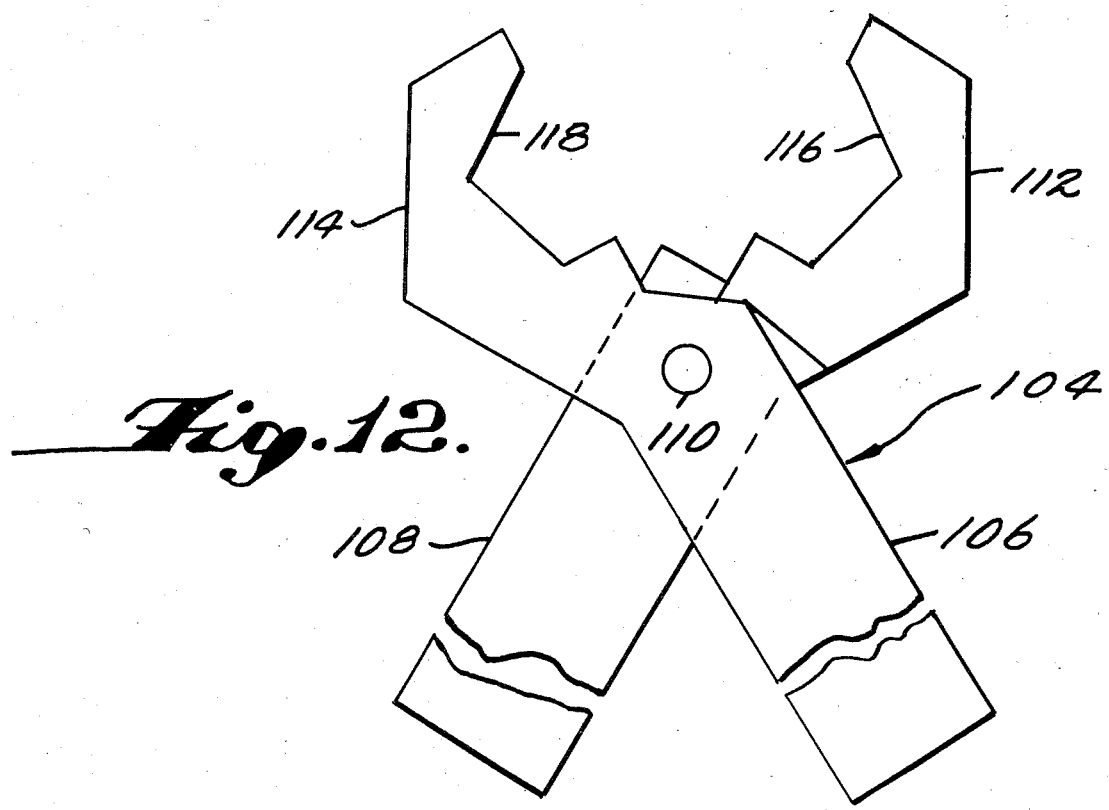
FIG. 12 is a plan view of a wrench for operating the tamperproof hydrant of the present invention.

In order to operate the tamperproof hydrant 10 just described, it will be noted that the dome shaped cap member 94 provides limited access to the polygonal end portion 60 of the operating nut 52. The space between the dome shaped cap member 94 and the tubular hold-down nut 58 is so limited that a conventional open end wrench would not fit and consequently only authorized personnel provided with a flat wrench 104 such as shown in FIG. 12 can get into the limited access space to engage the polygonal end portion 60 of the operating nut 52. The wrench shown in FIG. 12 may be of the type shown in the Diaz U.S. Pat. No. Re. 27,616 and it would include two metal strips 106 and 108 pivoted to one another at 110 and having operational end portions 112 and 114 provided with recesses 116 and 118 to define a polygonal configuration.

Figure 13:
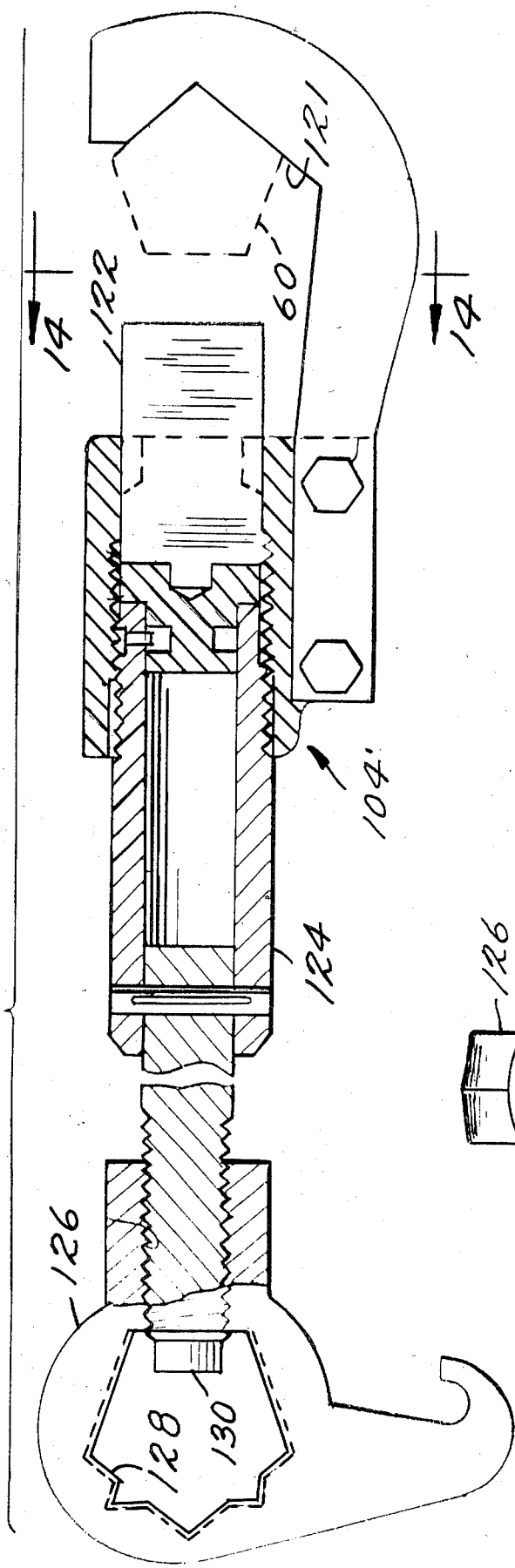
FIG. 13 is a plan view partly in section illustrating a modified form of operating tool.
Figure 14:
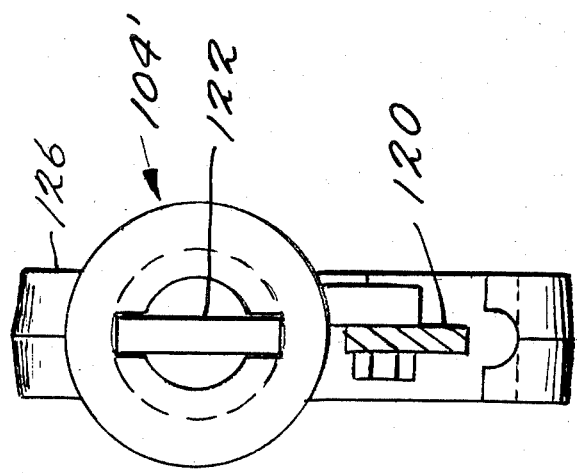
FIG. 14 is a sectional view taken on the line 14—14 of FIG. 13.

Referring now to FIGS. 13 and 14, there is disclosed an improved type of adjustable wrench 104' capable of operating the tamperproof hydrant heretofore described. The wrench 104' is adjustable for different size polygonal shaped end portions 60 of the operating nut 52 and includes a flat fixed jaw part 120 having a configuration 121 for engaging two sides of the operating nut 52 and a flat movable jaw part 122 for contacting an opposite side of the operating nut. Additionally the wrench includes a heavy handle assembly 124 with a head part 126 having a polygonal configuration 128. This head part 126 is also adjustable by means of the movable member 130 and is utilized for removing the closure 36 from the hydrant nozzle 34. A detailed disclosure of the tool 104' will be found in the copending U.S. application Ser. No. 736,831, filed concurrently on May 22, 1985 herewith by Joseph L. Daghe, Dennis W. Humes and Dale Stanley and entitled "OPERATING WRENCH FOR TAMPERPROOF HYDRANTS".

The terminology used throughout the specification is for the purpose of description and not limitation, the invention being defined by the scope of the appended claims.

What is claimed is:

1. A tamperproof fire hydrant comprising:
a barrel member having an open end portion;
valve means positioned in the lower portion of said barrel member;
reciprocating valve stem means extending from said valve means upwardly within said barrel member and having a threaded end portion;
a top closure member secured to the open upper end of said barrel member, said top closure member having an aperture therethrough with an inwardly extending shoulder therein and threads positioned outwardly of said shoulder;

a rotatable operating nut having a polygonal end portion projecting out of the aperture of said top closure member, said rotatable operating nut having an exterior flange thereon operatively abutting said shoulder in said aperture of said top closure member, said rotatable operating nut having threads thereon cooperating with the upper threaded end portion of said valve stem means whereby said nut member can be rotated to actuate said valve stem means;

a tubular hold-down nut threaded into said apertured top closure member and operatively abutting said exterior flange of said operating nut to position said operating nut against axial movement, said hold-down nut having a portion extending out of said top closure member, said outwardly extending portion having a frusto-conical outwardly facing surface provided with at least two inwardly axially extending and circumferentially spaced holes;

a retaining ring groove extending about said polygonal end portion of said operating nut;

an annular retainer member having an inside diameter sufficient to loosely fit over and rotate relative to said polygonal end portion of said operating nut, said annular retainer member having a bottom face with at least a pair of upwardly axially extending and circumferentially spaced holes, said retainer member further having an external peripheral threaded surface and an upper face with an annular recess extending about an inner periphery thereof;

a retaining means loosely carried in the annular groove on said polygonal upper portion of said operating nut, said retaining means bearing loosely in said recess on said upper face of said retainer member to prevent axial movement of said retainer member outwardly therefrom; and a dome shaped cap covering the operating nut having a skirt depending downwardly therefrom with an interior threaded surface for cooperating with the exterior threaded surface of said retainer member, said dome shaped cap when threaded onto said retainer member being freely rotatable relative to the polygonal portion of said operating nut with a lower edge of said skirt permitting only limited access to said polygonal end portion, said holes in said hold-down nut and said holes in said retainer member.

2. A tamperproof fire hydrant as claimed in claim 1 in which said retaining means includes a pair of flat semicircular C-clips having an inner portion loosely engaging in said annular groove on said polygonal portion of said operating nut and an outer portion loosely received in said recess on said upper face of said retainer member.

3. A tamperproof fire hydrant as claimed in claim 2 wherein said C-clips are made from a metal material.

4. A tamperproof fire hydrant as claimed in claim 3 wherein said annular retainer member is made from brass.

5. A tamperproof fire hydrant as claimed in claim 3 wherein said annular retainer member is made from high strength brass.

6. A tamperproof fire hydrant as claimed in claim 5 wherein said plastic material is acetal.

7. A tamperproof fire hydrant as claimed in claim 4 wherein said metal material of said C-clips is stainless steel.

8. A tamperproof fire hydrant comprising:

a barrel member having an open end portion;

valve means positioned in the lower portion of said barrel member;

reciprocating valve stem means extending from said valve means upwardly within said barrel member and having a threaded end portion;

a top closure member secured to the open upper end of said barrel member, said top closure member having an aperture therethrough;

a rotatable operating nut having a polygonal end portion projecting out of the aperture of said top closure member, said rotatable operating nut having a lower portion with threads thereon cooperating with the upper threaded end portion of said valve stem means;

means for preventing axial movement of said operating nut while permitting rotational movement to actuate said valve stem means;

a retaining ring groove extending about said polygonal end portion of said operating nut;

an annular retainer member having an inside diameter sufficient to loosely fit over and rotate relative to said polygonal end portion of said operating nut, said annular retainer member having a bottom face with at least a pair of upwardly axially extending and circumferentially spaced holes, said retainer member further having an external peripheral threaded surface and an upper face with an annular recess extending about an inner periphery thereof;

at least a pair of flat arcuate shaped C-clips, each having inner portions loosely engaging in said groove on said polygonal upper portion of said operating nut and outer portions extending radially outwardly of the polygonal upper portion of said operating nut, said outer portions being loosely received in said recess on said upper face of said retainer member to prevent axial movement of said retainer member outwardly therefrom; and a dome shaped cap for the operating nut having a skirt depending therefrom with an interior threaded surface for cooperating with the exterior threaded surface of said retainer member, said skirt having a maximum diameter greater than the aperture of said top closure member, said dome shaped cap when threaded onto said retainer member being freely rotatable relative to the polygonal portion of said operating nut with a lower edge of said skirt permitting only limited access to said polygonal end portion and to said holes in said retainer member.

9. A tamperproof fire hydrant as claimed in claim 8 wherein said at least a pair of flat arcuate shaped C-clips are made from a metal material, and said annular retainer member is made from brass.

* * * * *